(12) United States Patent
Shi et al.

(10) Patent No.: US 10,999,771 B2
(45) Date of Patent: May 4, 2021

(54) HANDOVER METHOD AND APPARATUS

(71) Applicant: ZTE CORPORATION, Guangdong (CN)

(72) Inventors: Xiaojuan Shi, Shenzhen (CN); He Huang, Shenzhen (CN); Jing Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/096,314

(22) Filed: Nov. 12, 2020

(65) Prior Publication Data
US 2021/0068016 A1 Mar. 4, 2021

Related U.S. Application Data

(63) Continuation of application No. PCT/CN2019/086761, filed on May 14, 2019.

(30) Foreign Application Priority Data

May 14, 2018 (CN) .......................... 201810456476.4

(51) Int. Cl.
H04W 36/08 (2009.01)
H04W 76/27 (2018.01)
H04W 36/00 (2009.01)

(52) U.S. Cl.
CPC ....... H04W 36/08 (2013.01); H04W 36/0085 (2018.08); H04W 76/27 (2018.02)

(58) Field of Classification Search
CPC .. H04W 36/08; H04W 76/27; H04W 36/0085
See application file for complete search history.

(56) References Cited

U.S. PATENT DOCUMENTS

2015/0373602 A1* 12/2015 Hampel ............ H04W 36/0016
455/437
2019/0297547 A1* 9/2019 Tsai ...................... H04L 5/0048
(Continued)

FOREIGN PATENT DOCUMENTS

CN 101841835 A 9/2010
CN 103546989 A 1/2014

OTHER PUBLICATIONS

International Search Report and Written Opinion for PCT Appl. No. PCT/CN2019/086761 dated Jul. 31, 2019 (with English translation, 8 pages).

Primary Examiner — Wil W Lin
(74) Attorney, Agent, or Firm — Foley & Lardner LLP

(57) ABSTRACT

Provided are a handover method and apparatus. The method includes following steps: a UE receives an RRC reconfiguration message sent by a source base station, where the RRC reconfiguration message includes a list of target cells for performing a conditional handover by the UE, information of each target cell in the list of the target cells for performing the conditional handover includes at least one of the following: frequency information of the target cell, a physical cell identifier of the target cell, a conditional handover command of the target cell generated by the target cell, or at least one piece of measurement configuration identifier information, and the at least one piece of measurement configuration identifier information is used for instructing an execution condition for the UE to perform a conditional handover in the target cell; and the UE performs a handover according to the RRC reconfiguration message.

30 Claims, 8 Drawing Sheets

(56) References Cited

U.S. PATENT DOCUMENTS

| | | | | |
|---|---|---|---|---|
| 2019/0349822 A1* | 11/2019 | Kim | .................. | H04W 76/10 |
| 2019/0394685 A1* | 12/2019 | Sharma | ............. | H04W 36/0055 |
| 2020/0045601 A1* | 2/2020 | Pedersen | ............... | H04W 36/08 |
| 2020/0053607 A1* | 2/2020 | Ingale | ............... | H04W 36/0058 |
| 2020/0367125 A1* | 11/2020 | Yoon | .................... | H04W 72/04 |

* cited by examiner

A UE receives a radio resource control reconfiguration message sent by a source base station, where the radio resource control reconfiguration message includes a list of target cells for performing a conditional handover by the UE, information of each target cell in the list of the target cells for performing the conditional handover includes at least one of the following: frequency information of the target cell, a physical cell identifier of the target cell, a conditional handover command of the target cell generated by the target cell, or at least one piece of measurement configuration identifier information, and the measurement configuration identifier information is used for instructing an execution condition for the UE to perform a conditional handover in the target cell ⎯ S102

The UE performs a handover according to the radio resource control reconfiguration message ⎯ S102

FIG. 1

A source base station sends a radio resource control reconfiguration message to a UE, where the radio resource control reconfiguration message includes a list of target cells for performing a conditional handover by the UE, information of each target cell in the list of the target cells for performing the conditional handover includes at least one of the following: frequency information of the target cell, a physical cell identifier of the target cell, a conditional handover command of the target cell generated by the target cell, or at least one piece of measurement configuration identifier information, and the measurement configuration identifier information is used for instructing an execution condition for the UE to perform a conditional handover in the target cell ⎯ S202

FIG. 2

Conditional handover trigger point    Actual handover point

HANDOVER METHOD AND APPARATUS

CROSS-REFERENCE TO RELATED APPLICATIONS

This application claims the benefit of priority under 35 U.S.C. § 120 as a continuation of PCT Patent Application No. PCT/CN2019/086761, filed on May 14, 2019, which claims priority to Chinese Patent Application No. 201810456476.4 filed on May 14, 2018, the disclosure of each of which is incorporated herein by reference in its entirety.

TECHNICAL FIELD

The present disclosure relates to the field of communications, and specifically, to a handover method and apparatus.

BACKGROUND

Mobility performance is one of the most important indicators in a wireless communication system. The industry has been committed to improving the mobility performance in the wireless communication system. For example, the 3rd generation partnership project (3GPP) has been continuously discussing and evaluating how to improve the mobility performance, including how to reduce handover failure probability, ping-pong probability and the like.

Taking a handover process of long term evolution (LTE) as an example, in a handover based on wireless signal quality, a basic handover or an enhanced handover process such as a make-before-break (MBB) handover or a random access channel-less handover (RACH-less HO) is triggered only when an "actual handover/mobility condition" is met. That is, a handover command is sent to a user equipment (UE) only when the "actual handover condition" is met. Here, the "actual handover condition" refers to that the signal quality of a target cell is good enough such that the UE can perform normal communication after switching to the target cell. Conversely, if the UE continues to stay on a source cell, a wireless link failure may be caused. In an LTE system, the "actual handover condition" may be that the signal quality meets an A3 event (the signal quality of a neighbour cell is one offset higher than the signal quality of a serving cell), an A4 event (the signal quality of a neighbour cell is higher than a threshold), an A5 event (the signal quality of a serving cell is lower than threshold 1 and the signal quality of a neighbour cell is higher than threshold 2), or the like. Reconfiguration of parameters, such as the offset of the A3 event and the threshold of the A4/A5 event, of the "actual handover condition" is usually determined after the network planning and the network optimization.

The mechanism that the handover is triggered only when the "actual handover condition" is met was originally designed for a homogeneous low-frequency network. However, with the evolution of networks, a heterogeneous network (HetNet) is deployed in addition to the homogeneous network, for example, a microcell is deployed within the coverage range of a traditional macrocell. Additionally, in a 5th generation mobile network (5G) system, high frequencies up to 100 GHz will be used in addition to low frequencies. In the 5G system, the deployment of cells becomes denser, and the coverage range of cells becomes smaller compared with systems before the 5G. This makes the handover (mobility) frequency in the 5G system more frequent than the previous systems. Additionally, after evaluation, it is found that the transmission of a measurement report and a handover command is more likely to fail in the 5G system. More frequent handovers and higher failure probabilities of the measurement report and the handover command ultimately lead to higher handover failure probability, higher ping-pong probability, higher wireless link failure probability and the like in the 5G system.

In view of the problem of the handover failure caused by the transmission failure of the measurement report or the handover command in the related art, no effective solution has been proposed.

SUMMARY

Embodiments of the present disclosure provide a handover method and apparatus to at least solve the problem of a handover failure caused by a transmission failure of a measurement report or a handover command in the related art.

An embodiment of the present disclosure provides a handover method. The method includes the following steps: a UE receives a radio resource control reconfiguration message sent by a source base station, where the radio resource control reconfiguration message includes a list of target cells for performing a conditional handover by the UE, information of each target cell in the list of the target cells for performing the conditional handover includes at least one of the following: frequency information of the target cell, a physical cell identifier of the target cell, a conditional handover command of the target cell generated by the target cell, or at least one piece of measurement configuration identifier information, and the at least one piece of measurement configuration identifier information is used for instructing an execution condition for the UE to perform a conditional handover in the target cell; and the UE performs a handover according to the radio resource control reconfiguration message.

Another embodiment of the present disclosure provides a handover method. The method includes the following step: a source base station sends a radio resource control reconfiguration message to a UE, where the radio resource control reconfiguration message includes a list of target cells for performing a conditional handover by the UE, information of each target cell in the list of the target cells for performing the conditional handover includes at least one of the following: frequency information of the target cell, a physical cell identifier of the target cell, a conditional handover command of the target cell generated by the target cell, or at least one piece of measurement configuration identifier information, and the at least one piece of measurement configuration identifier information is used for instructing an execution condition for the UE to perform a conditional handover in the target cell.

Another embodiment of the present disclosure provides a handover apparatus. The apparatus is applied to a UE and includes a reception module and a first handover module. The reception module is configured for the UE to receive a radio resource control reconfiguration message sent by a source base station, where the radio resource control reconfiguration message includes a list of target cells for performing a conditional handover by the UE, information of each target cell in the list of the target cells for performing the conditional handover includes at least one of the following: frequency information of the target cell, a physical cell identifier of the target cell, a conditional handover command of the target cell generated by the target cell, or at least one piece of measurement configuration identifier information, and the at least one piece of measurement configuration identifier information is used for instructing an execution condition for the UE to perform a conditional handover in the target cell. The first handover module is configured to perform a handover according to the radio resource control reconfiguration message.

Another embodiment of the present disclosure provides a handover apparatus. The apparatus is applied to a base station and includes a second handover module. The second handover module is configured to send a radio resource control reconfiguration message to a UE, where the radio resource control reconfiguration message includes a list of target cells for performing a conditional handover by the UE, information of each target cell in the list of the target cells for performing the conditional handover includes at least one of the following: frequency information of the target cell, a physical cell identifier of the target cell, a conditional handover command of the target cell generated by the target cell, or at least one piece of measurement configuration identifier information, and the at least one piece of measurement configuration identifier information is used for instructing an execution condition for the UE to perform a conditional handover in the target cell.

Another embodiment of the present disclosure further provides a storage medium. The storage medium stores a computer program. The computer program is configured to, when executed, perform the steps of any method embodiment described above.

Another embodiment of the present disclosure further provides an electronic device. The electronic device includes a memory and a processor. The memory stores a computer program. The processor is configured to execute the computer program to perform the steps in any method embodiment described above.

According to the present disclosure, the UE receives the radio resource control reconfiguration message sent by the source base station, where the radio resource control reconfiguration message includes the list of the target cells for performing the conditional handover by the UE, the information of each target cell in the list of the target cells for performing the conditional handover includes at least one of the following: the frequency information of the target cell, the physical cell identifier of the target cell, the conditional handover command of the target cell generated by the target cell, or the at least one piece of measurement configuration identifier information, and the at least one piece of measurement configuration identifier information is used for instructing the execution condition for the UE to perform the conditional handover in the target cell; and the UE performs the handover according to the radio resource control reconfiguration message. That is, compared with the existing conditional handover in which only one target cell is selected, in the present disclosure, the list of the target cells is configured and one target cell is selected from multiple target cells, thus solving the problem of the handover failure caused by the transmission failure of the measurement report or the handover command in the related art, and improving the mobility performance.

BRIEF DESCRIPTION OF DRAWINGS

The drawings described herein are used for providing a further understanding of the present disclosure and form a part of the present application. The illustrative embodiments and the description thereof in the present disclosure are used for explaining the present disclosure and not intended to limit the present disclosure in an improper manner. In the drawings:

FIG. 1 is a flowchart of a handover method according to an embodiment of the present disclosure;

FIG. 2 is a flowchart of another handover method according to an embodiment of the present disclosure;

DETAILED DESCRIPTION

Figure 3:
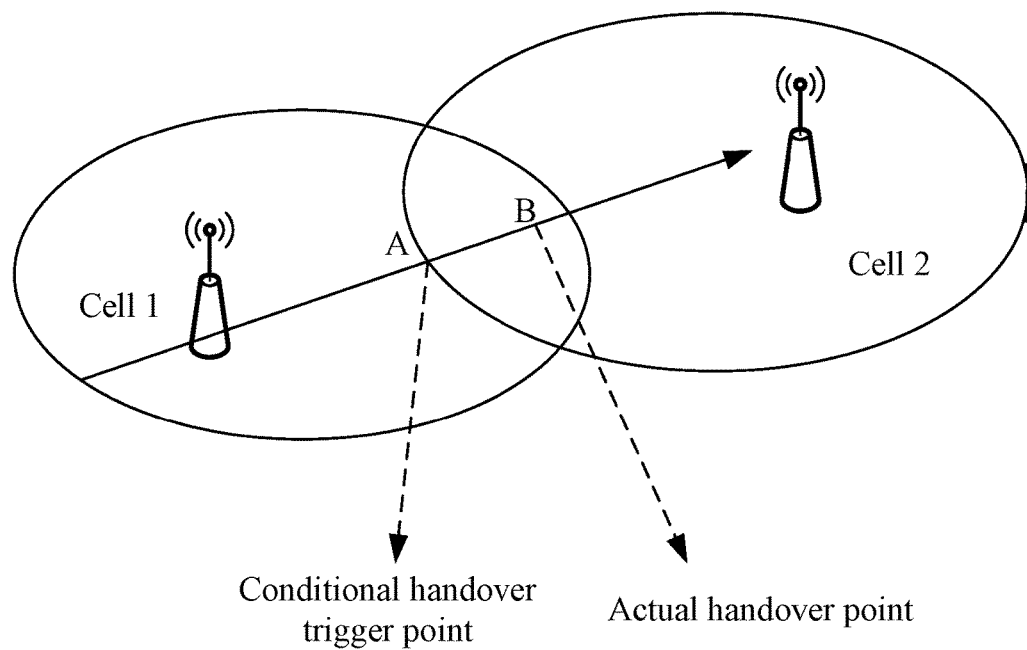
FIG. 3 is schematic diagram one of a handover scenario according to an optional embodiment of the present disclosure.

The present disclosure will be described hereinafter in detail with reference to drawings and in conjunction with embodiments. It is to be noted that if not in collision, the embodiments and features thereof in the present application may be combined with each other.

It is to be noted that the terms "first", "second" and the like in the description, claims and the preceding drawings of the present disclosure are used for distinguishing between similar objects but not necessarily used for describing a particular order or sequence.

Embodiment One

This embodiment provides a handover method. FIG. 1 is a flowchart of a handover method according to an embodiment of the present disclosure. As shown in FIG. 1, the process includes the steps described below.

In step S102, a UE receives a radio resource control reconfiguration message sent by a source base station. The radio resource control reconfiguration message includes a list of target cells for performing a conditional handover by the UE. Information of each target cell in the list of the target cells for performing the conditional handover includes at least one of the following: frequency information of the target cell, a physical cell identifier of the target cell, a conditional handover command of the target cell generated by the target cell, or at least one piece of measurement configuration identifier information. The measurement configuration identifier information is used for instructing an execution condition for the UE to perform a conditional handover in the target cell.

In step S104, the UE performs a handover according to the radio resource control reconfiguration message.

Through the preceding steps, compared with the existing conditional handover in which only one target cell is selected, in the present disclosure, the list of the target cells is configured and one target cell is selected from multiple target cells, thus solving a problem of a handover failure caused by a transmission failure of a measurement report or a handover command in the related art, and improving the mobility performance.

In an optional implementation, the conditional handover command of the target cell is sent to the source base station by the target cell through an interface message. The interface message includes a configuration list of target cells. A configuration of each target cell in the configuration list of the target cells includes a cell global identifier (CGI) of the target cell, a conditional handover command of the target cell, and one piece of the following information: protocol data unit (PDU) session information successfully admitted on the target cell, or evolved-radio access bearer (E-RAB) information successfully admitted on the target cell.

Optionally, the conditional handover command of the target cell includes a radio resource control (RRC) message transaction identifier allocated to the conditional handover command by the target cell.

Optionally, in the case where the information of each target cell in the list of the target cells for performing the conditional handover includes the at least one piece of measurement configuration identifier information, the method further includes the following step: a cell individual offset of the target cell in a measurement object configuration associated with the measurement configuration identifier information is modified or increased.

Optionally, in the case where the information of each target cell in the list of the target cells for performing the conditional handover includes the at least one piece of measurement configuration identification information, the information of each target cell in the list of the target cells for performing the conditional handover further includes an offset or a threshold.

Optionally, when the UE receives the offset or the threshold, the method further includes the following steps: the UE uses the offset to replace an offset in the measurement object configuration associated with the measurement configuration identifier information, or the UE uses the threshold to replace a threshold in the measurement object configuration associated with the measurement configuration identifier information; or the UE calculates the sum of the offset and an offset in the measurement object configuration associated with the measurement configuration identifier information, or the UE calculates the sum of the threshold and an threshold in the measurement object configuration associated with the measurement configuration identifier information.

Optionally, before the step in which the UE receives the radio resource control reconfiguration message sent by the source base station, the method further includes the following step: the UE receives at least two sets of parameters configured for the same measurement event by the source base station, or the method further includes the following step: the UE receives at least two sets of parameters configured for the same measurement event by the source base station and carried in the radio resource control reconfiguration message. The two sets of parameters include a first set of parameters and a second set of parameters. The first set of parameters is used for instructing the UE to perform a conditional handover. The second set of parameters is used for instructing the UE to perform a non-conditional handover.

It is to be noted that the preceding same measurement event may be a measurement event configured in a measurement report configuration associated with the measurement configuration identifier information.

Optionally, the step in which the UE performs the handover according to the radio resource control reconfiguration message includes the following steps: if a measurement result of at least one target cell included in the radio resource control reconfiguration message meets a reporting condition of a report configuration associated with the measurement configuration identifier information, it is determined that an execution condition for the UE to perform a conditional handover in a target cell is met; and the UE performs handover to the target cell.

Optionally, after the step in which the UE receives the radio resource control reconfiguration message sent by the source base station, the method further includes the following steps: if the UE determines that a beam recovery failure or a radio link failure occurs in a source cell, the UE selects one target cell from the list of the target cells; and the UE performs handover to the one target cell.

Optionally, after the step in which the UE receives the radio resource control reconfiguration message sent by the source base station, the method further includes the following step: the UE replies a radio resource control reconfiguration complete message to the source base station. The radio resource control reconfiguration complete message carries an RRC message transaction identifier allocated to the radio resource control reconfiguration message by the source base station.

Optionally, when the UE performs the handover according to the radio resource control reconfiguration message, the method further includes the following step: the UE replies, to the target cell, a radio resource control reconfiguration complete message carrying an RRC message transaction identifier allocated to the conditional handover command by the target cell.

This embodiment further provides a handover method. FIG. 2 is a flowchart of another handover method according to an embodiment of the present disclosure. As shown in FIG. 2, the process includes the steps described below.

In step S202, a source base station sends a radio resource control reconfiguration message to a UE. The radio resource control reconfiguration message includes a list of target cells for performing a conditional handover by the UE. Information of each target cell in the list of the target cells for performing the conditional handover includes at least one of the following: frequency information of the target cell, a physical cell identifier of the target cell, a conditional handover command of the target cell generated by the target cell, or at least one piece of measurement configuration identifier information. The measurement configuration identifier information is used for instructing an execution condition for the UE to perform a conditional handover in the target cell.

Through the preceding steps, compared with the existing conditional handover in which only one target cell is selected, in the present disclosure, the list of the target cells is configured and one target cell is selected from multiple target cells, thus solving the problem of the handover failure caused by the transmission failure of the measurement report or the handover command in the related art, and improving the mobility performance.

In an optional implementation, the conditional handover command of the target cell is sent to the source base station by the target cell through an interface message. The interface message includes a configuration list of target cells. A configuration of each target cell in the configuration list of the target cells includes a CGI of the target cell, a conditional handover command of the target cell, and one piece of the following information: PDU session information successfully admitted on the target cell, or E-RAB information successfully admitted on the target cell.

Optionally, the method further includes the following steps: after the target cell receives a sounding reference signal (SRS) sent by the UE, uplink grant of the target cell configured in a conditional handover command starts to take effect, or the target cell starts scheduling; or after the target cell generates the radio resource control reconfiguration message, a timer is started, and after the timer expires, uplink grant of the target cell configured in a conditional handover command starts to take effect, or the target cell starts scheduling.

This embodiment is described by way of example below in conjunction with optional embodiments and examples.

Figure 4:
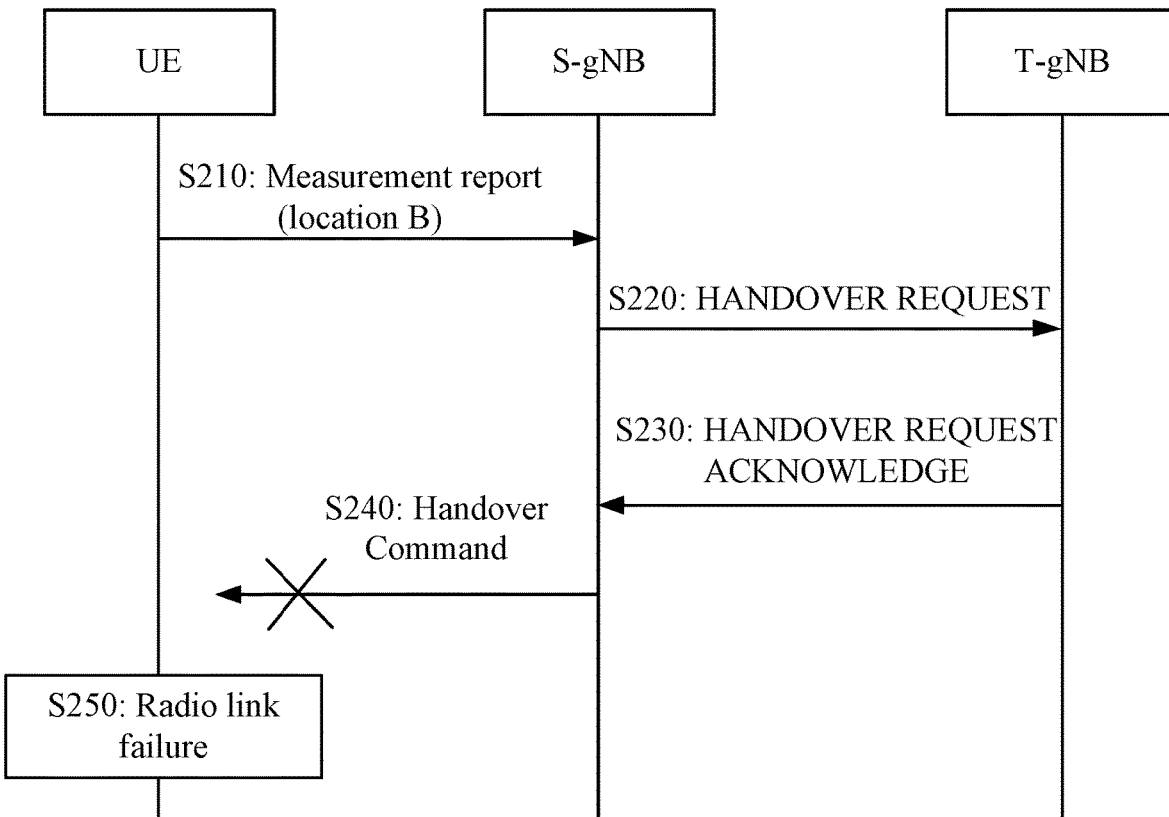
FIG. 4 is a flowchart of a failure of the related handover technology.

FIG. 3 is a schematic diagram of a possible handover scenario. In FIG. 3, a UE moves from cell 1 to cell 2. In the existing handover technology, the handover process is initiated only when an "actual handover condition" (for example, point B in FIG. 3) is met. In a 5G system, due to the dense deployment of cells and the use of high frequencies, using the existing handover technology will easily cause a handover failure. FIG. 4 is a flowchart of a possible handover failure caused by the existing handover technology. As shown in FIG. 4, when the UE moves to point B shown in FIG. 3 and determines that the "actual handover condition" is met, the UE sends a measurement report to a source base station (S210). After the source base station receives the measurement report, the source base station starts to notify a target base station to perform handover preparation (S220). After receiving a handover request acknowledge message from the target base station (S230), the source base station sends a handover command to the UE (S240). However, since the signal quality of the source base station has become very poor at this time, the transmission of the handover command fails. After a period of time, the UE has a radio link failure at the source base station (S250).

Figure 5:
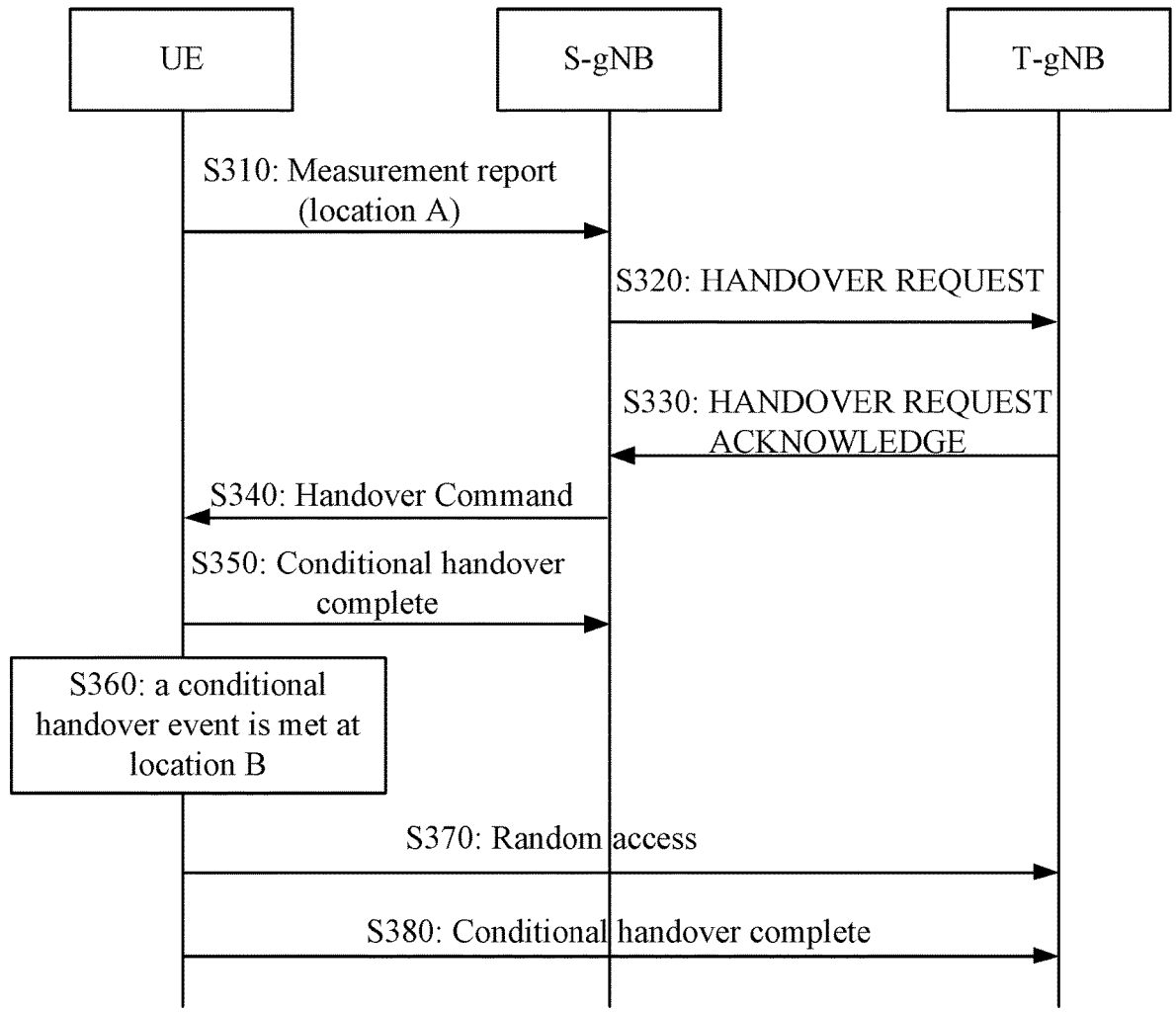
FIG. 5 is a handover flowchart of a conditional handover according to an optional embodiment of the present disclosure.

To overcome the problem of undesired handover performance caused by applying the existing handover technology to the 5G system, the industry proposes a conditional handover, which may also be referred to as advance handover preparation. The overall handover process of the conditional handover is as shown in FIG. 5 and includes the steps described below.

In step S310, when a UE meets an "advance handover preparation condition" (or may be referred to as a "conditional handover trigger condition"), the UE sends a measurement report to a source base station.

Information of a cell that meets the "advance handover preparation condition" is reported in the measurement report. The information includes a cell identifier such as a physical cell identifier (PCI), a measurement result of the cell, a measurement result of a beam that meets a reporting condition in the cell, and the like. The measurement result of the beam here refers to a measurement result of a certain single measurement reference signal, while the measurement result of the cell is a measurement result of multiple measurement reference signals in the cell after being averaged. The measurement reference signal includes, for example, synchronization signal (SS) blocks, a channel state information reference signal (CSI-RS).

The "advance handover preparation condition" is configured for the UE by a base station. The "advance handover preparation condition" is met before the "actual handover condition" is met.

For example, the "advance handover preparation condition" is met at point A in FIG. 3.

In step S320, the source base station sends a handover request to the target base station.

After the source base station receives the measurement report, the source base station sends, according to the measurement report, a handover request to a target cell that meets the "advance handover preparation condition". The handover request includes related configuration information of the UE at the source base station, a cell individual measurement result of the target cell, and a beam measurement result of the target cell.

In step S330, the target base station replies a handover request acknowledgement to the source base station.

The handover request acknowledgement includes a conditional handover command sent to the UE. The conditional handover command includes target cell information, information required by the UE to access the target cell, a "conditional handover execution condition" and the like. The target cell information includes a PCI of the target cell and frequency information used by the target cell. The information required by the UE to access the target cell includes random access configuration information for the UE to access the target cell in the manner of random access, public configuration information of the target cell, specific configuration information configured for the UE by the target cell, and the like.

In step S340, the source base station sends a conditional handover command to the UE.

In step S350, the UE sends a conditional handover complete message to the source base station.

After the UE receives the conditional handover command, the UE does not immediately perform a handover and continues to stay on a source cell. The UE continues to measure the target cell indicated in the conditional handover command.

In step S360, the target cell meets the "conditional handover execution condition".

As shown in FIG. 3, when the UE moves to point B, cell 2 meets the "conditional handover execution condition".

In step S370, the UE accesses cell 2. For example, the UE accesses cell 2 in the manner of random access.

In S340, the UE sends a conditional handover success message to the target cell.

In the conditional handover, the handover preparation process is completed in advance before the "actual handover condition" is met, and the handover command is sent to the UE in advance when the signal quality of the source cell is good enough, thus avoiding the handover failure caused by the transmission failure of the measurement report or the handover command in the related art, and effectively improving the mobility performance.

Key techniques for implementing the conditional handover in the present disclosure are described below with detailed optional embodiments.

Optional Embodiment One

Figure 6:
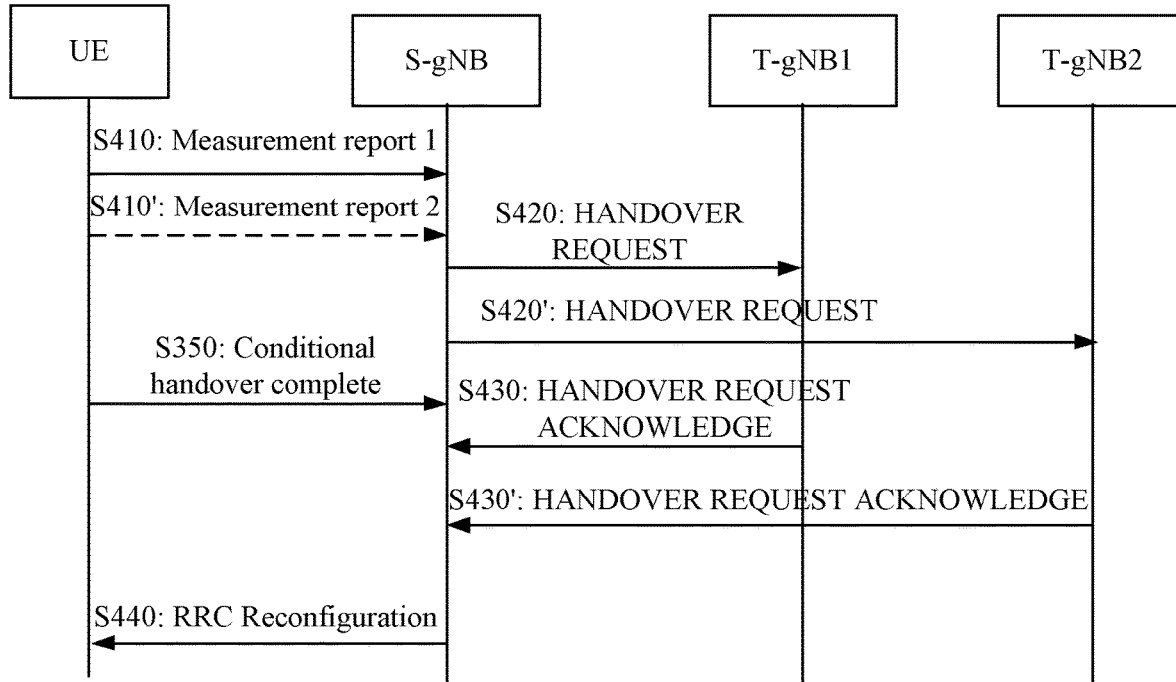
FIG. 6 is a handover preparation flowchart of a conditional handover according to an optional embodiment of the present disclosure.

In a conditional handover, to avoid the transmission failure of a measurement report or a handover command, a UE reports a measurement report before an "actual handover condition" is met, that is, when an "advance handover preparation condition" is met. To achieve this purpose, the "advance handover preparation condition" is more relaxed than the "actual handover condition". Taking configuring an A4 event (the signal quality of a neighbour cell is higher than a threshold) as an example, if a threshold that the "actual handover condition" is met is Th1 and a threshold that the "advance handover preparation condition" is met is Th2, then Th2<Th1 is configured. Since the threshold of the "advance handover preparation condition" is lower than the threshold of the "actual handover condition", compared with the "actual handover condition", there are multiple neighbour cells that meet the "advance handover preparation" condition at the same time. FIG. 6 is a handover preparation flowchart of a conditional handover. The process includes the steps described below.

In step S410/S410', when the UE meets the "advance handover preparation condition", the UE reports a measurement report to the source base station.

When the base station configures measurements, the base station configures a frequency as a measurement object. Different frequencies are configured as different measurement objects. Cells at different frequencies meet the "advance handover preparation condition" and the cells report their respective measurement reports. Information of all cells that meet the "advance handover preparation condition" on a frequency is reported in a measurement report. For example, the source base station respectively configures measurements for frequencies F1 and F2. F1 corresponds to measurement object 1. F2 corresponds to measurement object 2. In this embodiment, cells on F1 and cells on F2 trigger measurement reports one after another in about the same time, so the UE respectively reports two measurement reports S410 and S410'. Information of all cells that meet the "advance handover preparation condition" on F1 and F2 are reported in the measurement reports.

In step S420/420', the source base station sends a handover request to the target base station.

In this embodiment, the source base station determines, according to the measurement reports received in step S410/S410', that cells meeting the "advance handover preparation condition" are located on target base station T-gNB1 and target base station T-gNB2 separately. The source base station initiates handover requests to target base stations T-gNB1 and T-gNB2. Each handover request includes a list of target cells in addition to relevant configuration information of the UE on the source base station. The list of the target cells at least includes a CGI of each target cell, and may further include a measurement result of each target cell.

In step S430/430', the target base station replies a handover request acknowledgement to the source base station.

The handover request acknowledgement includes a configuration list of target cells, that is, includes configuration information of target cells that are admitted by the target base station and in which a handover configuration is successfully completed. The configuration list of the target cells includes a CGI of each target cell, PDU session information (if the UE accesses a 5G core network) or E-RAB information (if the UE accesses an LTE core network) successfully admitted on each target cell, and a conditional handover command of each target cell. The conditional handover command is generated by the target cell. For example, the target cell generates an RRC reconfiguration message (RRCReconfiguration), the generated RRCReconfiguration is directly included in the handover request acknowledgement in the form of a character flow (OCTETSTRING) (or also referred to as the form of a container). The RRCReconfiguration message generated by each target cell includes an RRC message transaction identifier (rrc-TransactionIdentifier) allocated to the RRCReconfiguration by the target cell.

In step S440, the source base station sends a conditional handover command to the UE.

The source base station sends the conditional handover command to the UE. The conditional handover command is included in RRCReconfiguration generated by the source base station.

One RRCReconfiguration may include conditional handover commands of multiple target cells. That is, the RRCReconfiguration includes a list of target cells for a conditional handover. The list of the target cells for the conditional handover includes frequency information of each target cell and a PCI of each target cell, a conditional handover command of the target cell generated by the target cell, and at least one piece of identifier information indicating a measurement configuration of a "conditional handover execution condition" of the target cell. The frequency information of the target cell is identified by an absolute radio frequency channel number (ARFCN). The identifier information indicating the measurement configuration of the "conditional handover execution condition" of the target cell may be identified by a measurement identity (measID). One measID is associated with one measurement object and one report configuration. The UE may determine the "conditional handover execution condition" of the target cell through the measID. The RRCReconfiguration generated by the source base station includes an rrc-TransactionIdentifier allocated to the RRCReconfiguration message by the source base station.

In optional embodiment one, an inter-base station interface exists between an S-gNB and a T-gNB, so handover preparation messages, including the handover request sent by the source base station to the target base station and the handover request acknowledgement fed back by the target base station to the source base station, between the S-gNB and the T-gNB are all directly transmitted through the inter-base station interface. In an actual network, there may be a case where no inter-base station interface is deployed on the source base station and the target base station. In this case, all messages related to the handover preparation are transmitted via a core network. For example, the source base station sends messages related to the handover preparation to the core network through an interface between the source base station and the core network, and the core network forwards the received messages to the target base station through an interface between the core network and the target base station; the target base station sends feedback messages related to the handover preparation to the core network through the interface between the target base station and the core network, and the core network forwards the received messages to the source base station through the interface between the core network and the source base station. Other optional embodiments are the same as the description here.

Optional Embodiment Two

In a conditional handover, after a UE receives a conditional handover command (included in RRCReconfiguration generated by a source cell as described in step S440 of embodiment one), the UE does not immediately perform a handover, but continues to stay on the source cell, and measures target cells in a list of target cells for the conditional handover included in the RRCReconfiguration. When the UE determines that there is a target cell that meets a "conditional handover execution condition" of this target cell indicated in the RRCReconfiguration, the UE performs the handover and accesses the target cell. As described in step S440 of embodiment one, the RRCReconfiguration message generated by the source cell includes identifier information, such as a measID, for indicating a measurement configuration of the "conditional handover execution condition" of each target cell. If a measurement result of a target cell meets a reporting condition of a report configuration (reportConfig) associated with the measID for indicating the measurement configuration of the "conditional handover execution condition" of the target cell, it is determined that the "conditional handover execution condition" of the target cell is met.

High frequency up to 100 GHz may be used in a 5G system. The high frequencies have the features of high path loss, high air absorption (oxygen absorption, rain fading and fog fading), sensitivity to shadow fading, and the like. Additionally, the high frequencies have high penetration loss. Thus, when a high-frequency link is blocked by a barrier, a link blockage easily occurs. To overcome the preceding features of the high-frequency link, the source cell may indicate more than one "conditional handover execution condition" for the target cell for the conditional handover in the RRCReconfiguration, that is, may indicate identifier information of more than one measurement configuration. Taking a measurement event A5 as an example, the source base station indicates two measIDs, measID1 and measID2, for a target cell for the conditional handover in the RRCReconfiguration. measID1 and measID2 are separately associated with two different reportConfigs, reportConfig1 and reportConfig2.

An A5 event configured in reportConfig1 is that the signal quality of a serving cell is lower than X1 and the signal quality of a neighbour cell is higher than Y1.

An A5 event configured in reportConfig2 is that the signal quality of a serving cell is lower than X2 and the signal quality of a neighbour cell is higher than Y2.

X1<X2 and Y1<Y2 are configured. In this embodiment, assuming that the "advance handover preparation condition" is also configured as an A5 event (the signal quality of a serving cell is lower than X0 and the signal quality of a neighbour cell is higher than Y0), or that the "advance handover preparation condition" is configured as an A4 event (the signal quality of a neighour cell is higher than Y0), Y0<Y1<Y2 and X1<X2<X0 are configured.

Figure 7:
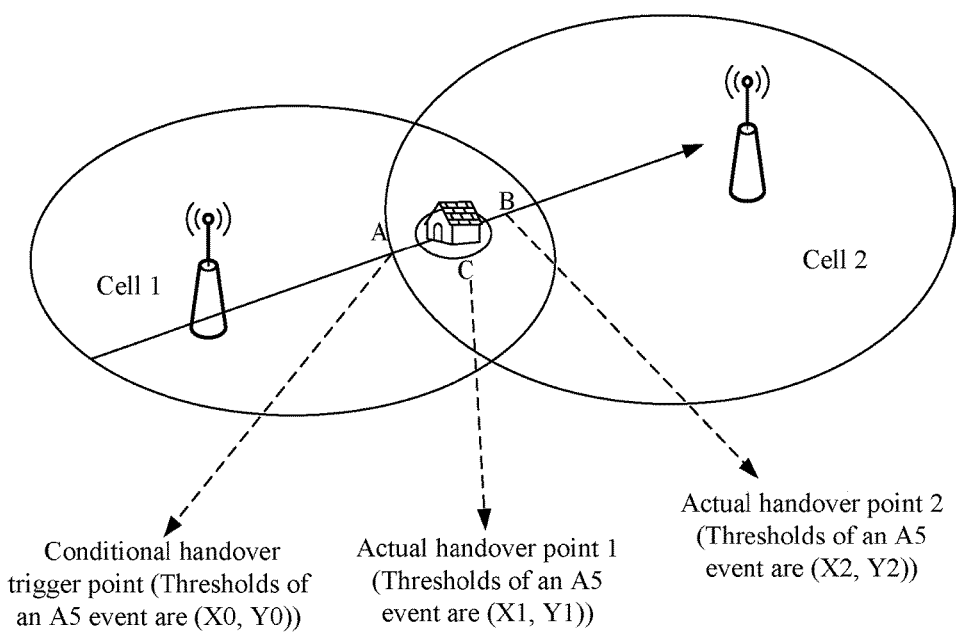
FIG. 7 is schematic diagram two of a handover scenario according to an optional embodiment of the present disclosure.

Based on the preceding configuration, taking a schematic diagram of a handover scenario in FIG. 7 as an example, when the UE has a blockage in a serving cell (point C in FIG. 7), although the value of X1 is a very small, it is met that the signal quality of the serving cell is less than X1 due to the occurrence of the blockage. In this case, if the signal quality of the target cell has been higher than Y1, reportConfig1 associated with measID1 meets a reporting condition, and the UE performs the conditional handover. However, in the normal case where no blockage occurs, when the UE moves to point B, a reporting condition of reportConfig2 associated with measID2 is met, such that the UE performs the conditional handover.

Optional Embodiment Three

In a conditional handover, a handover preparation process is completed in advance before an "actual handover condition" is met, and a handover command is sent to a UE in advance when the signal quality of a source cell is good enough. Therefore, compared with the existing handover technology, trigger time of a "conditional handover execution condition" may be later than trigger time of an "actual handover condition" in the existing handover technology. Taking an A3 event as an example, for the same handover scenario, if at the end of the existing handover, an offset of the A3 event is configured to be O1 while the offset of the A3 event is configured to be O2 in the "conditional handover execution condition", then O2>O1 may be configured. To achieve the preceding purpose, the three implementations described below are proposed in this embodiment.

Implementation One

When a source base station sends a list of targets cells for a conditional handover to a UE (refer to step S440 of embodiment one), the source base station modifies (if configuring in advance) or increases (if not configuring in advance) a cell individual offset of the target cell in a measurement object configuration associated with the measID in addition to providing, in the list of the target cells for the conditional handover, an ARFCN and a PCI of each conditional handover cell, a conditional handover command of the target cell, and identifier information (for example, measID) indicating a measurement configuration of a "conditional handover execution condition" of the target cell. The cell individual offset is used by the UE to evaluate the "conditional handover execution condition" of the target cell. Generally, when a base station modifies a configuration parameter of a measurement object, the UE deletes the saved measurement result of the measurement object, stops a periodic measurement reporting timer for reporting a measurement result of the measurement object, and stops a timer (timeToTrigger) for performing layer 3 (L3, referring to an RRC layer here) filtering on the measurement result of the measurement object. In this embodiment, to ensure the mobility performance, the preceding operations are not performed when the cell individual offset is modified or increased.

Implementation Two

When a source base station sends a list of targets cells for a conditional handover to a UE (refer to step S440 of embodiment one), the source base station further provides an offset or a threshold in addition to providing, in the list of the targets cells for the conditional handover, an ARFCN and a PCI of each cell for the conditional handover, a conditional handover command of the target cell, and identifier information (for example, measID) indicating a measurement configuration of a "conditional handover execution condition" of the target cell. According to the design of a system, the UE performs one of the operations described below after receiving the offset or the threshold.

Operation one: The offset is used for replacing an offset configured in a measurement object associated with the identifier information (for example, the measID) of the measurement configuration of the "conditional handover execution condition" of the target cell, or the threshold is used for replacing an threshold configured in a measurement object associated with the identifier information (for example, the measID) of the measurement configuration of the "conditional handover execution condition" of the target cell.

Operation two: The sum of the offset and an offset configured in a measurement object associated with the identifier information (for example, the measID) of the measurement configuration of the "conditional handover execution condition" of the target cell is calculated, or the sum of the threshold and a threshold configured in a measurement object associated with the identifier information (for example, the measID) of the measurement configuration of the "conditional handover execution condition" of the target cell is calculated.

After the UE obtains the calculated offset or threshold according to one of the preceding operations, the UE uses the calculated offset or threshold to evaluate whether the target cell meets the "conditional handover execution condition".

Taking an A3 event as an example, before the list of the target cells for the handover is received, an A3 event configured for the UE in measID1 by the base station is that the signal quality of a neighbour cell is one offset higher than the signal quality of a serving cell, and the offset is configured to be 3 dB. In the list of the target cells for the conditional handover, the base station configures identifier information indicating a measurement configuration of a "conditional handover execution condition" of a target cell to be measID1, and configures an offset of 2 dB. After the UE receives the offset, the UE performs operation two to obtain an offset of the A3 event of measID1 is 5 dB. The UE uses 5 dB to evaluate whether the target cell meets the A3 event, that is, meets the "conditional handover execution condition".

Also taking the A3 event as an example, before the list of the target cells for the handover is received, the A3 event configured for the UE in measID1 by the base station is that the signal quality of a neighbour cell is one offset higher than the signal quality of the serving cell, and the offset is configured to be 3 dB. In the list of the target cells for the conditional handover, the base station configures identifier information indicating a measurement configuration of a "conditional handover execution condition" of a target cell to be measID1, and configures an offset of 5 dB. After the UE receives the offset, the UE performs operation one to obtain an offset of the A3 event of measID1 is 5 dB. The UE uses 5 dB to evaluate whether the target cell meets the A3 event, that is, meets the "conditional handover execution condition".

Implementation Three

When a source base station configures reportConfig, the source base station configures two sets of parameters for the same event, for example, configures two thresholds for evaluating a neighbour cell, configures two offsets, and indicates one set of the two sets of parameters to be used for a normal handover and the other set to be used for a conditional handover.

Taking configuring an A4 event (the signal quality of a neighbour cell is higher than a threshold) as an example, two thresholds Th1 and Th2 are configured, and it is indicated that Th1 is used for the normal handover and Th2 is used for the conditional handover. The UE uses Th1 to evaluate whether a target cell meets a normal handover condition and uses Th2 to determine whether the target cell meets a "conditional handover execution condition".

Taking configuring an A3 event (the signal quality of a neighbour cell is one offset higher than the signal quality of a serving cell) as an example, two offsets Offset1 and Offset2 are configured, and it is indicated that Offset1 is used for the normal handover and Offset2 is used for the conditional handover. The UE uses Offset1 to evaluate whether the target cell meets the normal handover condition, and uses Th2 to determine whether the target cell meets the "conditional handover execution condition".

Optional Embodiment Four

High frequencies up to 100 GHz may be used in a 5G system. When a high-frequency link is blocked by a barrier, a blockage easily occurs. In the 5G system, wireless link quality is monitored by two mechanisms, that is, beam link monitoring and radio link monitoring. When a UE determines that a beam failure occurs, the UE performs a beam failure recovery process. The beam recovery may fail, for example, a beam having sufficiently good signal quality is not found, or a beam recovery acknowledgement is not received from a base station, or the like.

In this embodiment, after the UE receives an RRCReconfiguration message including a list of targets cells for a conditional handover sent by a source base station, if the UE determines that the beam recovery failure or a wireless link failure occurs in a source cell, the UE selects one target cell for the conditional handover from the list of the targets cells and switches to the target cell.

Figure 8:
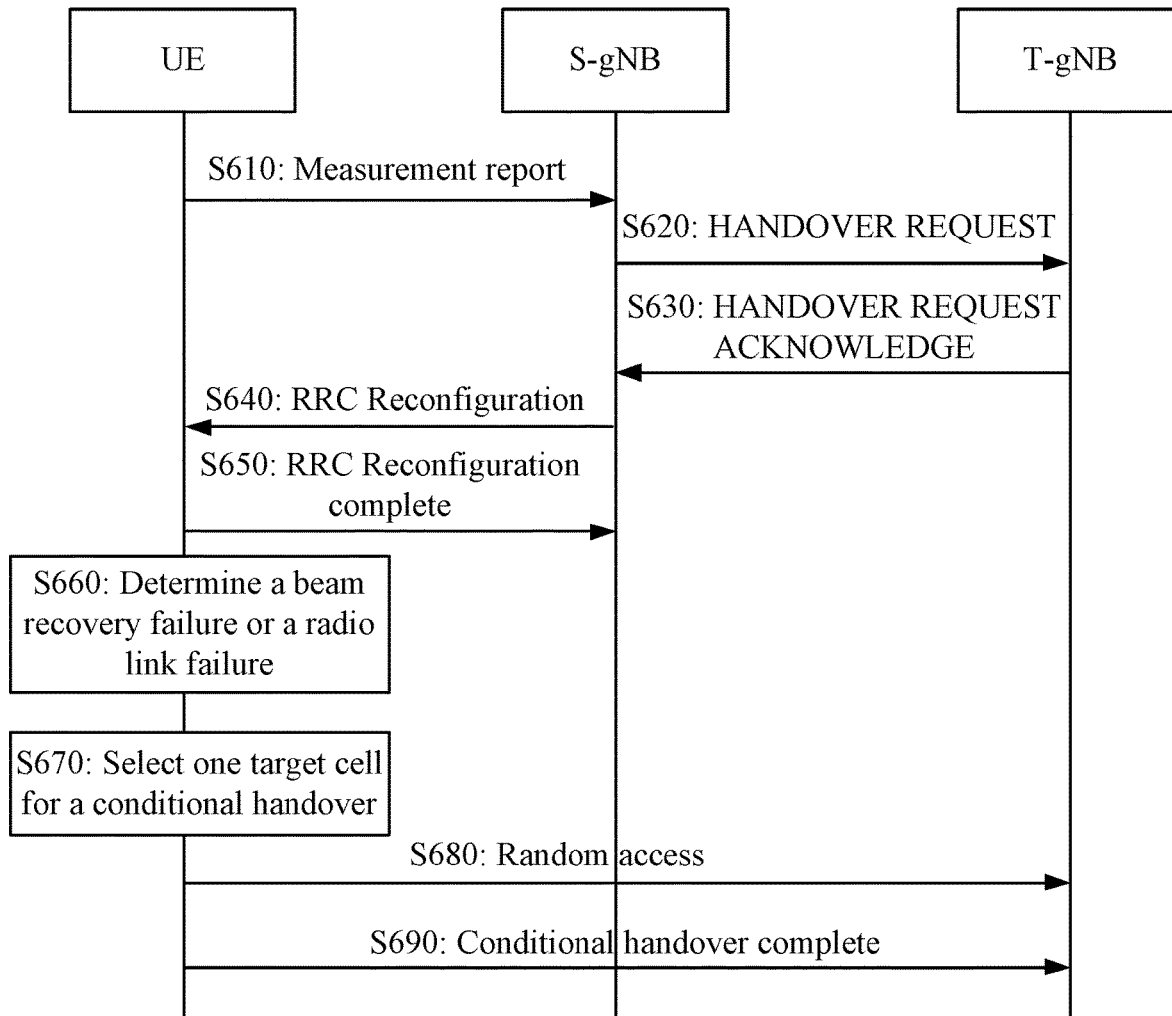
FIG. 8 is an implementation flowchart according to optional embodiment four of the present disclosure.

FIG. 8 is an implementation flowchart according to this embodiment. The process includes steps S610, S620, S630 and S640, which are similar to steps S410, S420, S430 and S440 in embodiment one, respectively.

In step S650, the UE replies an RRCReconfigurationComplete message to the source base station.

In step S660, before there is a target cell for the conditional handover that meets a "conditional handover execution condition" corresponding to the target cell, the UE determines the beam recovery failure or the wireless link failure.

In step S670, the UE selects one target cell for the conditional handover.

The UE may select one cell having the best signal quality from the list of the target cells for the conditional handover. Alternatively, the UE may select one cell having the largest number of beams with good quality from the list of the target cells for the conditional handover. Alternatively, the UE may select a certain target cell from the list of the target cells for the conditional handover according to an algorithm of the UE.

In step S680, the UE accesses the selected target cell.

In step S690, the UE sends an RRCReconfigurationComplete to the target cell.

Optional Embodiment Five

As described in optional embodiment two, conditional handover commands (referred to as RRCReconfiguration-conds for distinguishing between descriptions) generated by multiple target cells for a conditional handover are included in an RRCReconfiguration generated by a source base station to be sent to a UE. The RRCReconfiguration includes an rrc-TransactionIdentifier allocated to the RRC message by the source base station. The RRCReconfiguration-cond includes an rrc-TransactionIdentifier allocated to the RRCReconfiguration-cond by a target cell. When the UE replies an RRCReconfigurationComplete message to the source base station, the rrc-TransactionIdentifier allocated to the RRCReconfiguration by the source base station is carried. When the UE accesses a target cell for the conditional handover, an RRCReconfigurationComplete message fed back to the target cell carries the rrc-TransactionIdentifier allocated to the RRCReconfiguration-cond message by the target cell and stored by the UE.

Figure 9:
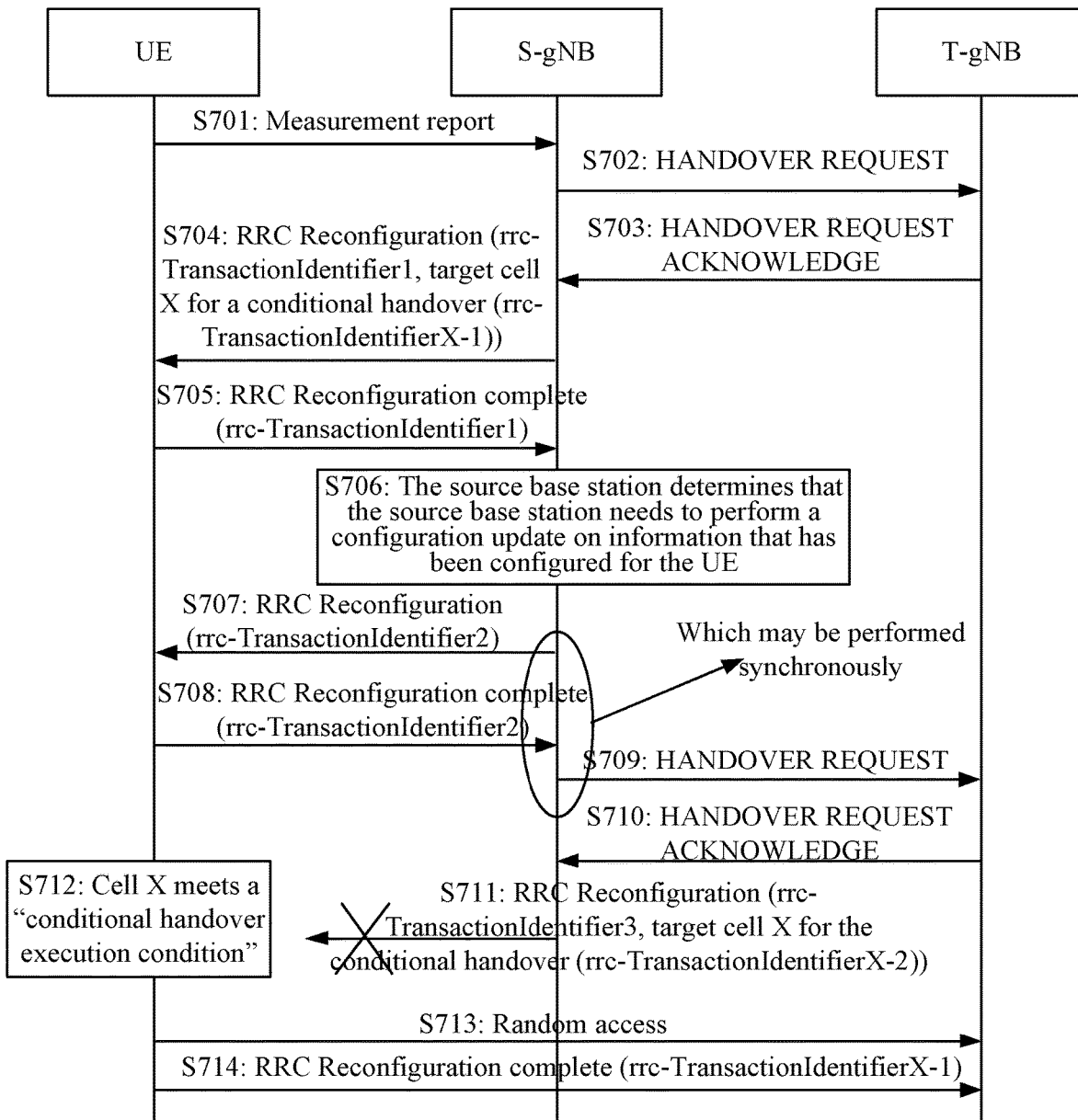
FIG. 9 is an implementation flowchart according to optional embodiment five of the present disclosure.

For example, FIG. 9 is an implementation flowchart according to optional embodiment five. The process includes steps S701, S702, S703 and S704, which are similar to steps S410, S420, S430 and S440 in optional embodiment one, respectively.

It is to be noted that in step 704 of this optional embodiment, an rrc-TransactionIdentifier allocated by the source base station to an RRCReconfiguration message generated by the source base station is rrc-TransactionIdentifier1. The RRCReconfiguration message includes target cell X for the conditional handover. An rrc-TransactionIdentifier in an RRCReconfiguration-cond message of target cell X for the conditional handover is rrc-TransactionIdentifierX-1.

In step S705, after the UE receives the step S704, the UE replies an RRCReconfigurationComplete message to the source base station. The message includes rrc-TransactionIdentifier1.

In step S706, the source base station determines that the source base station needs to perform a configuration update on information that has been configured for the UE.

For example, in this optional embodiment, the source base station needs to perform a configuration update on a configuration parameter (for example, a data radio bearer (DRB) configuration) of a source cell.

In step S707, the source base station sends an RRCReconfiguration to the UE. The rrc-TransactionIdentifier of the message is rrc-TransactionIdentifier2. The message does not include information of any target cell for the conditional handover.

In step S708, after the UE receives the information in step S707, the UE replies an RRCReconfigurationComplete message to the source base station. The message includes rrc-TransactionIdentifier2.

In step S709, the source base station sends a handover request to the target base station.

A configuration (included in the RRCReconfiguration-cond) of target cell X for the conditional handover is configured by target cell X for the conditional handover according to configuration information of the source cell. Thus, when the configuration of the source cell is updated, the configuration of target cell X for the conditional handover also needs to be updated accordingly. Therefore, the source base station sends the handover request to the target base station. It is to be noted that there is no strict timing relationship among the three steps S709, S707 and S708. For example, steps S709 and S707 may be performed simultaneously.

In step S710, the target base station replies a handover request acknowledgement to the source base station. The handover request acknowledgment includes the updated configuration information of target cell X for the conditional handover. Similarly, the configuration information is included in an RRCReconfiguration-cond generated by target cell X for the conditional handover. In this case, an rrc-TransactionIdentifier included in the RRCReconfiguration-cond is rrc-TransactionIdentifierX2.

In step S711, the source base station sends an RRCReconfiguration to the UE. An rrc-TransactionIdentifier of the message is rrc-TransactionIdentifier3. The message includes the RRCReconfiguration-cond (including rrc-TransactionIdentifierX2) of target cell X for the conditional handover received from step S710.

In this optional embodiment, since the signal quality of the source cell has become very poor at this time, the transmission of the RRCReconfiguration fails. That is, the UE does not receive the message.

In step S712, cell X meets a "conditional handover execution condition".

In step S713, the UE accesses cell X.

In step S714, the UE replies an RRCReconfigurationComplete message to cell X. The message includes rrc-TransactionIdentifierX-1.

When cell X receives the RRCReconfigurationComplete, configuration information used by the UE to access cell X may be determined through rrc-TransactionIdentifierX-1.

Optional Embodiment Six

In all the optional embodiments described above, a UE accesses a target cell for a conditional handover in the manner of random access. However, in some deployment scenarios, the UE does not need to access the target cell for the conditional handover in the manner of random access, for example, in the case where the target cell for the conditional handover has the same timing adjustment (TA) as a source base station or a TA between the UE and the target cell for the conditional handover is 0. When the UE does not need to perform random access in the target cell, such a handover may be referred to as an RACH-less handover.

In the existing handover technology, when the RACH-less handover is performed, after a target cell receives a handover request from a source cell, one of the two operations described below is performed.

Operation one: Uplink grant is configured for the UE. The configured uplink grant is included in an RRCReconfiguration message generated by the target cell. The RRCReconfiguration is fed back to the source base station through a handover request acknowledge message. Then, the source base station sends the received RRCReconfiguration to the UE. After the UE receives the RRCReconfiguration message, the UE performs a handover and directly sends uplink data on the target cell by using the uplink grant configured in the RRCReconfiguration.

Operation two: A target base station generates an RRCReconfiguration. The RRCReconfiguration is not configured with uplink grant, but instructs the UE to perform the RACH-less handover. After the target base station replies a handover request acknowledge message to the source base station, the target base station starts to schedule the UE. The RRCReconfiguration is fed back to the source base station through the handover request acknowledge message. Then, the source base station sends the received RRCReconfiguration to the UE. After the UE receives the RRCReconfiguration message, the UE listens for the scheduling of the target base station, and directly sends uplink data or receives downlink data on the target cell according to the scheduling of the target base station.

In the preceding two operations, the target base station needs to configure the uplink grant in advance or starts to schedule the UE in advance. Compared with the mechanism that the UE directly performs the handover after receiving a handover command in the existing handover technology, this mechanism of configuring the uplink grant in advance or starting to schedule the UE in advance does not cause too much wastes of resources. However, if this mechanism is applied to a conditional handover process, since the handover preparation is performed in advance, but the real handover is not performed until the "conditional handover execution condition" is met, considerable wastes of resources are caused. To solve this problem, two solutions are proposed here.

Solution one: After a target cell for the conditional handover receives an SRS sent by the UE, the configured uplink grant starts to take effect (if the uplink grant is configured in a conditional handover command (RRCReconfiguration)), or the target cell for the conditional handover starts scheduling.

Figure 10:
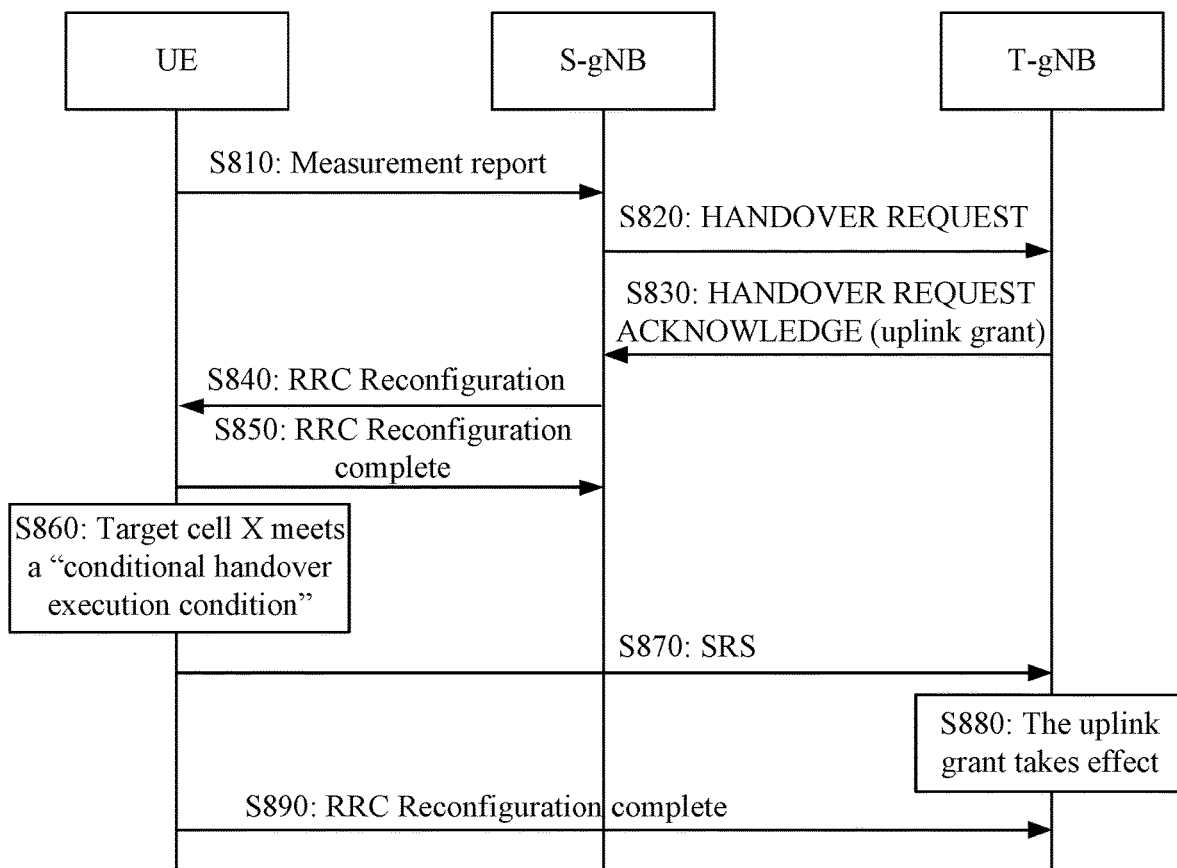
FIG. 10 is an implementation flowchart of solution one according to optional embodiment six of the present disclosure.

FIG. 10 is an implementation flowchart of solution one. The process includes steps S810 and S820, which are similar to steps S410 and S420 in embodiment one, respectively.

In step S830, the target base station replies a handover request acknowledgment to the source base station.

The handover request acknowledgement includes a configuration list of target cells. Optionally, an RRCReconfiguration generated by a target cell may include uplink grant of the target cell configured for the UE in advance. Whether to configure the uplink grant is determined by the target cell according to an algorithm and a strategy of the target cell.

If the uplink grant is configured, the uplink grant does not take effect immediately after configured.

In step S840, the source base station sends a conditional handover command to the UE.

In step S850, the UE replies an RRCReconfigurationComplete message to the source base station.

In step S860, there is target cell X that meets a "conditional handover execution condition".

In step S870, the UE sends an SRS to target cell X.

The UE sends the SRS to target cell X according to the SRS configured for the UE by target cell X in the conditional handover command.

In step S880, after target cell X receives the SRS from the UE, if the uplink grant is configured in step S830, the uplink grant takes effect; if no uplink grant is configured in step S830, the UE starts to be scheduled.

In step S890, the UE replies an RRCReconfiguration complete message to target cell X.

Solution two: After a target cell for the conditional handover generates a conditional handover command (RRCReconfiguration), the target cell for the conditional handover starts timer T. After the timer T expires, the configured uplink grant starts to take effect (if the uplink grant is configured in a conditional handover command (RRCReconfiguration)), or the target cell for the conditional handover starts scheduling.

Figure 11:
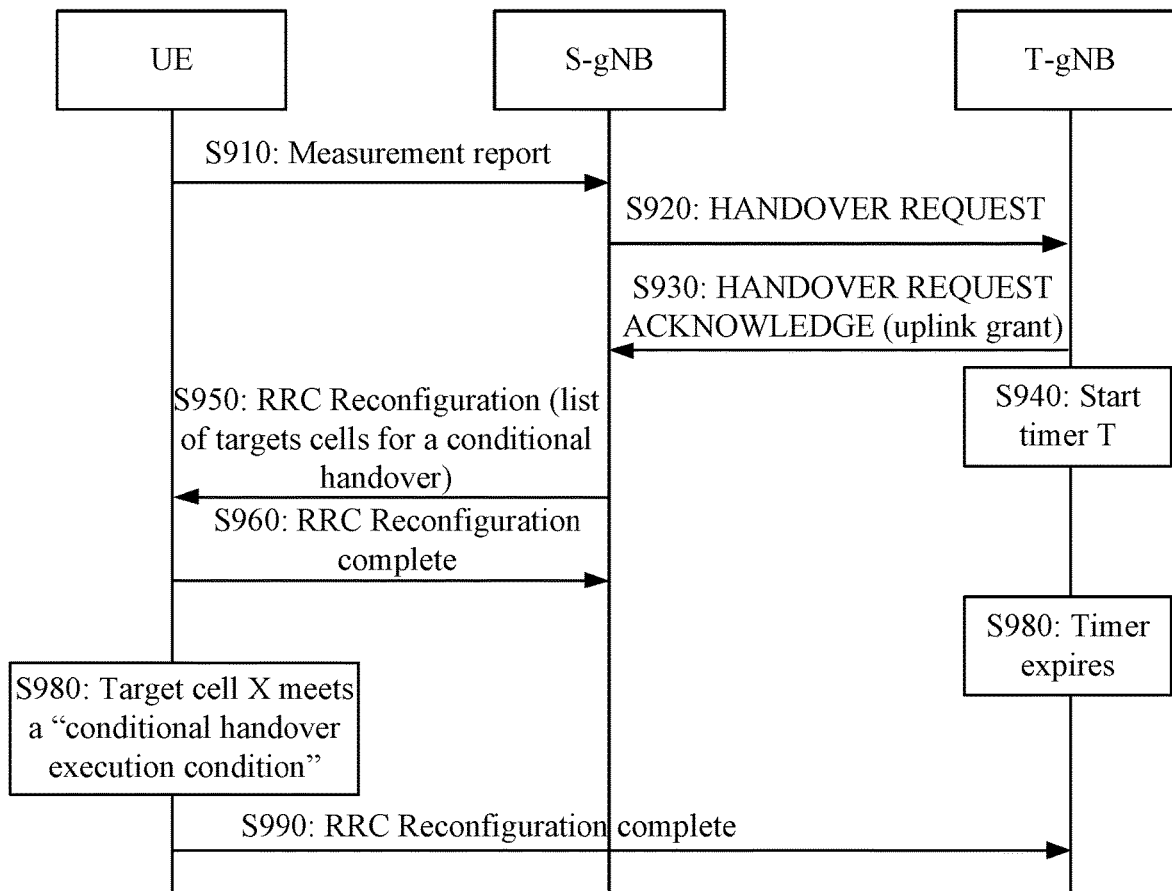
FIG. 11 is an implementation flowchart of solution two according to optional embodiment six of the present disclosure.

FIG. 11 is an implementation flowchart of solution two. The process includes steps S910, S920 and S930, which are similar to steps S910, S920 and S930 in solution one, respectively.

In step S940, the target cell for the conditional handover starts timer T after generating a conditional handover command (RRCReconfiguration).

Step S950 is the same as step S840 in solution one described above.

Step S960 is the same as step S850 in solution one described above.

In step S970, when timer T expires, the configured uplink grant starts to take effect (if the uplink grant is configured in a conditional handover command (RRCReconfiguration)), or the target cell for the conditional handover starts scheduling.

Step S980 is the same as step S860 in solution one described above.

Step S990 is the same as step S890 in solution one described above.

From the description of the implementations described above, it is apparent to those skilled in the art that the methods in the embodiments described above may be implemented by software plus a necessary general-purpose hardware platform, or may, of course, be implemented by hardware. However, in many cases, the former is a preferred implementation. Based on this understanding, the technical solutions of the present disclosure substantially, or the part contributing to the related art, may be embodied in the form of a software product. The computer software product is stored in a storage medium (such as a read only memory (ROM)/random access memory (RAM), a magnetic disk or an optical disk) and includes several instructions for enabling a terminal device (which may be a mobile phone, a computer, a server, a network device or the like) to perform the methods described in the embodiments of the present disclosure.

Embodiment Two

This embodiment further provides a handover apparatus. The apparatus is configured to implement the embodiments and preferred implementations described above. What has been described is not repeated. As used below, the term "module" may be software, hardware or a combination of software and hardware capable of implementing predetermined functions. The apparatuses in the embodiment described below are preferably implemented by software, but an implementation by hardware or by a combination of software and hardware is also possible and conceived.

Figure 12:
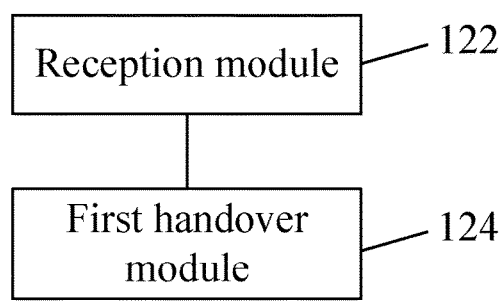
FIG. 12 is a structural block diagram of a handover apparatus according to an embodiment of the present disclosure.

FIG. 12 is a structural block diagram of a handover apparatus according to an embodiment of the present disclosure. As shown in FIG. 2, the apparatus includes a reception module 122 and a first handover module 124. The reception module 122 is configured for a UE to receive a radio resource control reconfiguration message sent by a source base station. The radio resource control reconfiguration message includes a list of target cells for performing a conditional handover by the UE. Information of each target cell in the list of the target cells for performing the conditional handover includes at least one of the following: frequency information of the target cell, a physical cell identifier of the target cell, a conditional handover command of the target cell generated by the target cell, or at least one piece of measurement configuration identifier information. The measurement configuration identifier information is used for instructing an execution condition for the UE to perform a conditional handover in the target cell. The first handover module 124 is configured to perform a handover according to the radio resource control reconfiguration message.

Through the apparatus shown in FIG. 12, compared with the existing conditional handover in which only one target cell is selected, in the present disclosure, the list of the target cells is configured, and one target cell is selected from multiple target cells, thus solving the problem of a handover failure caused by a transmission failure of a measurement report or a handover command in the related art, and improving the mobility performance.

In an optional implementation, the conditional handover command of the target cell is sent to the source base station by the target cell through an interface message. The interface message includes a configuration list of target cells. A configuration of each target cell in the configuration list of the target cells includes a CGI of the target cell, a conditional handover command of the target cell, and one piece of the following information: PDU session information successfully admitted on the target cell, or E-RAB information successfully admitted on the target cell.

Optionally, the conditional handover command of the target cell includes an RRC message transaction identifier allocated to the conditional handover command by the target cell.

Optionally, in the case where the information of each target cell in the list of the target cells for performing the conditional handover includes the at least one piece of measurement configuration identifier information, the apparatus is further configured to modify or increase a cell individual offset of the target cell in a measurement object configuration associated with the measurement configuration identifier information.

Optionally, in the case where the information of each target cell in the list of the target cells for performing the conditional handover includes the at least one piece of measurement configuration identification information, the information of each target cell in the list of the target cells for performing the conditional handover further includes an offset or a threshold.

Optionally, when the UE receives the offset or the threshold, the apparatus is further configured to perform the following operations: the UE uses the offset to replace an offset in the measurement object configuration associated with the measurement configuration identifier information, or the UE uses the threshold to replace an threshold in the measurement object configuration associated with the measurement configuration identifier information; or the UE calculates the sum of the offset and an offset in the measurement object configuration associated with the measurement configuration identifier information, or the UE calculates the sum of the threshold and an threshold in the measurement object configuration associated with the measurement configuration identifier information.

Optionally, before the operation in which the UE receives the radio resource control reconfiguration message sent by the source base station, the apparatus is further configured to perform the following operation: the UE receives at least two sets of parameters configured for the same measurement event by the source base station; or the apparatus is further configured to perform the following operation: the UE receives at least two sets of parameters configured for the same measurement event by the source base station and carried in the radio resource control reconfiguration message. The two sets of parameters include a first set of parameters and a second set of parameters. The first set of parameters is used for instructing the UE to perform a conditional handover. The second set of parameters is used for instructing the UE to perform a non-conditional handover.

Optionally, the operation in which the UE performs the handover according to the radio resource control reconfiguration message includes the following operation: if a measurement result of at least one target cell included in the radio resource control reconfiguration message meets a reporting condition of a report configuration associated with the measurement configuration identifier information, it is determined that an execution condition for the UE to perform a conditional handover in the target cell is met; and the UE switches to the target cell.

Optionally, after the operation in which the UE receives the radio resource control reconfiguration message sent by the source base station, the apparatus is further configured to perform the following operations: if the UE determines that a beam recovery failure or a radio link failure occurs in a source cell, the UE selects one target cell from the list of the target cells; and the UE switches to the one target cell.

Optionally, after the operation in which the UE receives the radio resource control reconfiguration message sent by the source base station, the apparatus is further configured to perform the following operations: the UE replies a radio resource control reconfiguration complete message to the source base station. The radio resource control reconfiguration complete message carries an RRC message transaction identifier allocated to the radio resource control reconfiguration message by the source base station.

Optionally, when the UE performs the handover according to the radio resource control reconfiguration message, the apparatus is further configured to perform the following operations: the UE replies, to the target cell, a radio resource control reconfiguration complete message carrying an RRC message transaction identifier allocated to the conditional handover command by the target cell.

Figure 13:
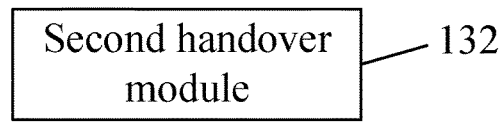
FIG. 13 is a structural block diagram of another handover apparatus according to an embodiment of the present disclosure.

This embodiment further provides a handover apparatus. FIG. 13 is a structural block diagram of another handover apparatus according to an embodiment of the present disclosure. As show in FIG. 13, the apparatus includes a second handover module 132. The second handover module 132 is configured to send a radio resource control reconfiguration message to a UE. The radio resource control reconfiguration message includes a list of target cells for performing a conditional handover by the UE. Information of each target cell in the list of the target cells for performing the conditional handover includes at least one of the following: frequency information of the target cell, a physical cell identifier of the target cell, a conditional handover command of the target cell generated by the target cell, or at least one piece of measurement configuration identifier information. The measurement configuration identifier information is used for instructing an execution condition for the UE to perform a conditional handover in the target cell.

In an optional implementation, the conditional handover command of the target cell is sent to the source base station by the target cell through an interface message. The interface message includes a configuration list of target cells. A configuration of each target cell in the configuration list of the target cells includes a CGI of the target cell, a conditional handover command of the target cell, and one piece of the following information: PDU session information successfully admitted on the target cell, or E-RAB information successfully admitted on the target cell.

Optionally, the apparatus is further configured to perform the following operations: after a target cell receives an SRS sent by the UE, uplink grant of the target cell configured in a conditional handover command starts to take effect, or the target cell starts scheduling; or after the target cell generates the radio resource control reconfiguration message, the target cell starts a timer, and after the timer expires, the uplink grant of the target cell configured in the conditional handover command starts to take effect, or the target cell starts scheduling.

Through the apparatus shown in FIG. 13, compared with the existing conditional handover in which only one target cell is selected, in the present disclosure, the list of the target cells is configured, and one target cell is selected from multiple target cells, thus solving the problem of the handover failure caused by the transmission failure of the measurement report or the handover command in the related art, and improving the mobility performance.

It is to be noted that the various modules described above may be implemented by software or hardware. An implementation by hardware may, but not necessarily, be performed in the following manner: the modules are located in the same processor or the modules are located in in different processors in any combination.

Embodiment Three

This embodiment of the present disclosure further provides a storage medium. The storage medium stores a computer program. The computer program is configured to, when executed, perform the steps in any method embodiment.

Optionally, in his embodiment, the storage medium may be configured to store a computer program for performing the following steps: in step S1, a UE receives a radio resource control reconfiguration message sent by a source base station, where the radio resource control reconfiguration message includes a list of target cells for performing a conditional handover by the UE, information of each target cell in the list of the target cells for performing the conditional handover includes at least one of the following: frequency information of the target cell, a physical cell identifier of the target cell, a conditional handover command of the target cell generated by the target cell, or at least one piece of measurement configuration identifier information, and the measurement configuration identifier information is used for instructing an execution condition for the UE to perform a conditional handover in the target cell; and in step S2, the UE performs a handover according to the radio resource control reconfiguration message.

Optionally, the storage medium is further configured to store a computer program for performing the following steps: in step S1, a source base station sends a radio resource control reconfiguration message to a UE. The radio resource control reconfiguration message includes a list of target cells for performing a conditional handover by the UE. Information of each target cell in the list of the target cells for performing the conditional handover includes at least one of the following: frequency information of the target cell, a physical cell identifier of the target cell, a conditional handover command of the target cell generated by the target cell, or at least one piece of measurement configuration identifier information. The measurement configuration identifier information is used for instructing an execution condition for the UE to perform a conditional handover in the target cell.

Optionally, in this embodiment, the storage medium may include, but is not limited to, a universal serial bus (USB) flash disk, an ROM, an RAM, a mobile hard disk, a magnetic disk, an optical disk or another medium capable of storing a computer program.

This embodiment of the present disclosure further provides an electronic device. The electronic device includes a memory and a processor. The memory stores a computer program. The processor is configured to execute the computer program to perform the steps in any method embodiment described above.

Optionally, the electronic device may further include a transmission device and an input and output device. Both the transmission device and the input and output device are connected to the processor.

Optionally, in this embodiment, the processor may be further configured to perform, through a computer program, the following steps: in step S1, a UE receives a radio resource control reconfiguration message sent by a source base station, where the radio resource control reconfiguration message includes a list of target cells for performing a conditional handover by the UE, information of each target cell in the list of the target cells for performing the conditional handover includes at least one of the following: frequency information of the target cell, a physical cell identifier of the target cell, a conditional handover command of the target cell, or at least one piece of measurement configuration identifier information, and the measurement configuration identifier information is used for instructing an execution condition for the UE to perform a conditional handover in the target cell; and in step S2, the UE performs a handover according to the radio resource control reconfiguration message.

Optionally, the electronic device is further configured to store a computer program for performing the steps described below.

In step S1, a source base station sends a radio resource control reconfiguration message to a UE. The radio resource control reconfiguration message includes a list of target cells for performing a conditional handover by the UE. Information of each target cell in the list of the target cells for performing the conditional handover includes at least one of the following: frequency information of the target cell, a physical cell identifier of the target cell, a conditional handover command of the target cell generated by the target cell, or at least one piece of measurement configuration identifier information. The measurement configuration identifier information is used for instructing an execution condition for the UE to perform a conditional handover in the target cell.

Optionally, for specific examples in this embodiment, reference may be made to the examples described in the preceding embodiments and optional implementations, which are not repeated in this embodiment.

Apparently, it is to be understood by those skilled in the art that the modules or steps of the present disclosure may be implemented by a general-purpose computing device and may be concentrated on a single computing device or distributed in a network formed by multiple computing devices. Optionally, these modules or steps may be implemented by program codes executable by the computing device. Thus, these modules or steps may be stored in a storage device and executed by the computing device. Moreover, in some cases, the illustrated or described steps may be executed in a sequence different from the sequence described herein. Alternatively, each of these modules or steps may be implemented by being made into an integrated circuit module, or multiple ones of these modules or steps may be implemented by being made into a single integrated circuit module. In this way, the present disclosure is not limited to any specific combination of hardware and software.

The above are only preferred embodiments of the present disclosure and are not intended to limit the present disclosure. For those skilled in the art, the present disclosure may have various modifications and variations. Any modifications, equivalent substitutions, improvements and the like within the principle of the present disclosure shall fall within the scope of the present disclosure.

What is claimed is:

1. A method, comprising:
 receiving, by a user equipment (UE), a radio resource control (RRC) reconfiguration message from a source base station, wherein the RRC reconfiguration message comprises a list of target cells for performing a conditional handover by the UE, and information of each target cell of the target cells which comprises: a conditional handover command of the target cell generated by the target cell, and at least one piece of measurement configuration identifier information to indicate an execution condition for the UE to perform a conditional handover to the target cell; and performing, by the UE, the conditional handover according to the RRC reconfiguration message.

2. The method of claim 1, wherein the conditional handover command of the target cell comprises an RRC message transaction identifier allocated to the conditional handover command by the target cell.

3. The method of claim 1, wherein the at least one piece of the measurement configuration identifier information comprises two pieces of the measurement configuration identifier information.

4. The method of claim 1, comprising:
responsive to a measurement result of at least a first target cell of the target cells meeting a reporting condition of a report configuration associated with the at least one piece of measurement configuration identifier information, determining that an execution condition for the UE to perform a conditional handover to the first target cell is met; and
performing, by the UE, the conditional handover to the first target cell.

5. The method of claim 1, comprising:
responsive to the UE determining that a radio link failure has occurred in a source cell, selecting, by the UE, a first target cell from the list of the target cells; and
performing, by the UE, the conditional handover to the first target cell.

6. The method of claim 1, wherein after receiving, by the UE, the RRC reconfiguration message from the source base station, the method comprises:
sending, by the UE, an RRC reconfiguration complete message to the source base station, wherein the RRC reconfiguration complete message includes an RRC message transaction identifier allocated to the RRC reconfiguration message by the source base station.

7. The method of claim 1, comprising:
sending, by the UE to a first target cell of the target cells, an RRC reconfiguration complete message carrying an RRC message transaction identifier allocated to the conditional handover command by the first target cell.

8. A non-transitory computer readable medium storing instructions, which when executed by at least one processor, cause the at least one processor to perform the method of claim 1.

9. A user equipment (UE), comprising:
at least one processor configured to implement:
receiving a radio resource control (RRC) reconfiguration message from a source base station, wherein the RRC reconfiguration message comprises a list of target cells for performing a conditional handover by the UE, and information of each target cell of the target cells which comprises: a conditional handover command of the target cell generated by the target cell, and at least one piece of measurement configuration identifier information to indicate an execution condition for the UE to perform a conditional handover to the target cell; and
performing the conditional handover according to the RRC reconfiguration message.

10. The UE of claim 9, wherein the conditional handover command of the target cell comprises an RRC message transaction identifier allocated to the conditional handover command by the target cell.

11. The UE of claim 9, wherein the at least one piece of the measurement configuration identifier information comprises two pieces of the measurement configuration identifier information.

12. The UE of claim 9, wherein the at least one processor is configured to implement:
responsive to a measurement result of at least a first target cell of the target cells meeting a reporting condition of a report configuration associated with the at least one piece of measurement configuration identifier information, determining that an execution condition for the UE to perform a conditional handover to the first target cell is met; and
performing the conditional handover to the first target cell.

13. The UE of claim 9, wherein the at least one processor is configured to implement:
responsive to determining that a radio link failure has occurred in a source cell, selecting a first target cell from the list of the target cells; and
performing the conditional handover to the first target cell.

14. The UE of claim 9, wherein the at least one processor is configured to implement:
after receiving the RRC reconfiguration message from the source base station, sending an RRC reconfiguration complete message to the source base station, wherein the RRC reconfiguration complete message includes an RRC message transaction identifier allocated to the RRC reconfiguration message by the source base station.

15. The UE of claim 9, wherein the at least one processor is configured to implement:
sending, to a first target cell of the target cells, an RRC reconfiguration complete message carrying an RRC message transaction identifier allocated to the conditional handover command by the first target cell.

16. A method, comprising:
transmitting, by a source base station to a user equipment (UE), a radio resource control (RRC) reconfiguration message, wherein the RRC reconfiguration message comprises a list of target cells for performing a conditional handover by the UE, and information of each target cell of the target cells which comprises: a conditional handover command of the target cell generated by the target cell, and at least one piece of measurement configuration identifier information to indicate an execution condition for the UE to perform a conditional handover to the target cell, and
wherein the RRC reconfiguration message is used by the UE to perform the conditional handover.

17. The method of claim 16, wherein the conditional handover command of the target cell comprises an RRC message transaction identifier allocated to the conditional handover command by the target cell.

18. The method of claim 16, wherein the at least one piece of the measurement configuration identifier information comprises two pieces of the measurement configuration identifier information.

19. The method of claim 16, wherein:
responsive to a measurement result of at least a first target cell of the target cells meeting a reporting condition of a report configuration associated with the at least one piece of measurement configuration identifier information, the UE determines that an execution condition for the UE to perform a conditional handover to the first target cell is met, and the UE performs the conditional handover to the first target cell.

20. The method of claim 16, wherein:
responsive to determining that a radio link failure has occurred in a source cell, the UE selects a first target cell from the list of the target cells, and
the UE performs the conditional handover to the first target cell.

21. The method of claim 16, wherein after the UE receives the RRC reconfiguration message from the source base station, the UE sends an RRC reconfiguration complete message to the source base station, the RRC reconfiguration complete message including an RRC message transaction identifier allocated to the RRC reconfiguration message by the source base station.

22. The method of claim 16, wherein the UE sends, to a first target cell of the target cells, an RRC reconfiguration complete message carrying an RRC message transaction identifier allocated to the conditional handover command by the first target cell.

23. A non-transitory computer readable medium storing instructions, which when executed by at least one processor, cause the at least one processor to perform the method of claim 16.

24. A source base station, comprising:
at least one processor configured to implement:
transmitting, to a user equipment (UE), a radio resource control (RRC) reconfiguration message,
wherein the RRC reconfiguration message comprises a list of target cells for performing a conditional handover by the UE, and information of each target cell of the target cells which comprises: a conditional handover command of the target cell generated by the target cell, and at least one piece of measurement configuration identifier information to indicate an execution condition for the UE to perform a conditional handover to the target cell, and
wherein the RRC reconfiguration message is used by the UE to perform the conditional handover.

25. The source base station of claim 24, wherein the conditional handover command of the target cell comprises an RRC message transaction identifier allocated to the conditional handover command by the target cell.

26. The source base station of claim 24, wherein the at least one piece of the measurement configuration identifier information comprises two pieces of the measurement configuration identifier information.

27. The source base station of claim 24, wherein:
responsive to a measurement result of at least a first target cell of the target cells meeting a reporting condition of a report configuration associated with the at least one piece of measurement configuration identifier information, the UE determines that an execution condition for the UE to perform a conditional handover to the first target cell is met, and
the UE performs the conditional handover to the first target cell.

28. The source base station of claim 24, wherein:
responsive to determining that a radio link failure has occurred in a source cell, the UE selects a first target cell from the list of the target cells, and
the UE performs the conditional handover to the first target cell.

29. The source base station of claim 24, wherein after the UE receives the RRC reconfiguration message from the source base station, the UE sends an RRC reconfiguration complete message to the source base station, the RRC reconfiguration complete message including an RRC message transaction identifier allocated to the RRC reconfiguration message by the source base station.

30. The source base station of claim 24, wherein the UE sends, to a first target cell of the target cells, an RRC reconfiguration complete message carrying an RRC message transaction identifier allocated to the conditional handover command by the first target cell.

* * * * *